United States Patent [19]
Zeiler

[11] 3,923,853
[45] Dec. 2, 1975

[54] PREPARATION OF SUBSTITUTED ISOTHIOCYANATES

[75] Inventor: Andrew G. Zeiler, Muskegon, Mich.

[73] Assignee: Story Chemical Corporation, Muskegon, Mich.

[22] Filed: Jan. 14, 1974

[21] Appl. No.: 433,049

[52] U.S. Cl. .................................... 260/454
[51] Int. Cl.² ............................... C07C 161/04
[58] Field of Search ............ 260/454, 687; 252/472

[56] References Cited
UNITED STATES PATENTS

| | | | |
|---|---|---|---|
| 1,540,448 | 6/1925 | Wilson | 252/472 |
| 3,404,171 | 10/1968 | Ulrich | 260/454 |
| 3,794,642 | 2/1974 | Kress | 260/687 |

FOREIGN PATENTS OR APPLICATIONS

| | | | |
|---|---|---|---|
| 1,024,913 | 4/1966 | United Kingdom | 260/454 |
| 581,338 | 8/1959 | Canada | 260/454 |

OTHER PUBLICATIONS

Hartman et al., "Removal of SO₂ From Flue Gas etc.," (1971) CA75 No. 154707w. (1971).

*Primary Examiner*—Glennon H. Hollrah
*Attorney, Agent, or Firm*—Cooper, Dunham, Clark, Griffin & Moran

[57] ABSTRACT

Substituted isothiocyanates, such as alkyl isothiocyanates, e.g. ethyl isothiocyanate, are prepared by contacting a reaction admixture formed from an amine, such as a primary amine, carbon disulfide and an aqueous alkali metal hydroxide solution with gaseous oxygen in the presence of a solvent and a catalyst to produce a substituted isothiocyanate, such as ethyl isothiocyanate when ethylamine is employed to form the reaction admixture. An embodiment of the invention is indicated by the chemical equation:

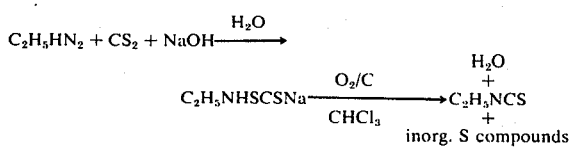

7 Claims, No Drawings

PREPARATION OF SUBSTITUTED ISOTHIOCYANATES

This invention relates to the preparation of substituted isothiocyanates. It is known to prepare substituted isothiocyanates, see U.S. Pats. No. 2,595,723, 2,762,826, 2,859,235, 2,859,236, 2,886,584, 2,894,013, 3,322,816, 3,404,171, 3,406,191 and 3,412,098, see also *Indian Journal of Chemistry*, (1970), page 759, the article by G. S. Johar, V. Agarwala and R. P. Bhaskara. The disclosures of each of the above-identified patents and the publication are herein incorporated and made part of this disclosure.

The invention disclosed and claimed in this application is related to the invention disclosed and claimed in my copending, coassigned application Ser. No. 433,048 filed Jan. 14, 1974 directed to the preparation of substituted isothiocyanates in a non-aqueous system.

It is an object of this invention to provide a process for the preparation of substituted isothiocyanates.

Another object of this invention is to provide a simple and economical method for the preparation of substituted isothiocyanates.

How these and other objects of this invention are accomplished will become apparent in the light of the accompanying disclosure. In at least one embodiment of the practice of this invention at least one of the foregoing objects will be achieved.

It has been discovered that substituted isothiocyanates are prepared by forming a reaction admixture comprising a primary amine, carbon disulfide and an aqueous alkali metal hydroxide solution and contacting the resulting formed reaction admixture with gaseous oxygen. The contacting of the reaction admixture with gaseous oxygen is carried out in the presence of a catalyst, preferably activated carbon, and desirably the contacting of the reaction admixture with gaseous oxygen is carried out in the presence of a solvent for the substituted isothiocyanate, preferably a water-immiscible solvent, such as an aromatic hydrocarbon, e.g. benzene, or a halogenated hydrocarbon, e.g. carbon tetrachloride or chloroform or mixtures thereof.

The practice of the invention is illustrated in one embodiment in the accompanying equation:

In the formation of the reaction admixture the amine is desirably added to a mixture of carbon disulfide and an aqueous alkali metal hydroxide solution. Preferably, the addition of the amine is carried out over a period of time, such as about an hour, more or less, with control of the temperature of the reaction by cooling to maintain the temperature of the reaction admixture to a temperature in the range from about 5°C. to about 30°C., more or less.

Upon the completion of the addition of the amine to the mixture of carbon disulfide and aqueous alkali metal hydroxide solution, a water-immiscible solvent for the substituted isothiocyanate, such as chloroform, and an oxidation catalyst, such as the activated carbon, are added. Thereupon gaseous oxygen, either in the form of substantially pure oxygen or air, is introduced into the reaction admixture over a period of time, such as up to about 6 hours, more or less, while maintaining the temperature of the resulting reaction admixture at a temperature in the range 5°–30°C., such as a temperature in the range 5°–10°C. or 15°–20°C.

The resulting reaction admixture is then filtered to separate any suspended sulfur compounds formed during the reaction. The substantially solids-free filtrate or mother liquor is then separated into an aqueous and non-aqueous phase. Desirably, the aqueous phase is extracted with additional solvent, such as chloroform, and the resulting chloroform wash or extract added to the separated non-aqueous phase for evaporation of the non-aqueous water-immiscible solvent therefrom to yield as product the desired substituted isothiocyanate.

The following examples are illustrative of the practices of this invention. As set forth in each of the accompanying examples a primary amine, such as a primary alkylamine, is added to a stirred mixture of carbon disulfide and aqueous NaOH to form the corresponding dithiocarbamate salt. The resulting reaction mixture or suspension has added thereto an organic solvent, such as a water-immiscible halogenated hydrocarbon, e.g. chloroform or carbon tetrachloride, and activated carbon as catalyst. Gaseous oxygen or air is then passed into the reaction admixture and the resulting exothermic reaction yields the corresponding substituted isothiocyanate.

EXAMPLE NO. 1

Preparation of Ethylisothiocyanate 64.5 grams (1 mol) of 70% aqueous ethylamine were added over a period of one hour to a stirred mixture of 76.1 grams (1 mol) of carbon disulfide and an aqueous solution containing 40 grams (1 mol) of NaOH in 150 ml of water. The temperature of the resulting admixture during the addition of the ethylamine was maintained in the range about 20°–25°C. with cooling. Upon completion of the addition of ethylamine the reaction admixture was stirred for an additional 0.5 hour at room temperature. Chloroform in the amount of 150 ml and activated carbon in the amount of 5 grams were then added and oxygen was introduced into the rapidly stirred reaction admixture at a rate of 150 ml/min for a period of 6 hours. During the introduction of the gaseous oxygen into the reaction admixture the temperature was maintained in the range 15°–20°C. with cooling. The resulting reaction admixture was filtered through a filter aid (Celite) and the resulting filter cake was washed with 100 ml of chloroform. The filtrate, including the chloroform washing, was then separated into an aqueous layer and a non-aqueous chloroform layer. The aqueous layer was extracted with 100 ml of chloroform and the resulting chloroform extract phase together with the non-aqueous chloroform layer separated from the resulting reaction admixture were combined and the chloroform evaporated to yield 65 grams of ethylisothiocyanate (75% yield).

EXAMPLE NO. 2

Preparation of N-propylisothiocyanate 29.5 grams (0.5 mol) of n-propylamine were added at a temperature in the range 5°–10°C. over a period of one hour to a stirred mixture of 38 grams (0.5 mol) of carbon disulfide and an aqueous solution of 20 grams (0.5 mol) of sodium hydroxide dissolved in 100 ml of water. 100 ml and 5 grams of activated carbon were then added to the reaction mixture and oxygen was introduced thereinto at a rate of 150 ml/min for a period of 3 hours. During the introduction of the gaseous oxygen the temperature of the reaction was maintained at a temperature in the range 5°–10°C. by cooling. The resulting reaction admixture was filtered and the resulting filter cake washed with 50 ml of chloroform. The filtrate was then separated into an aqueous layer and a non-aqueous chloroform layer. The aqueous layer was extracted with 50 ml of chloroform and the resulting chloroform washing and the separated non-aqueous chloroform layer combined and the chloroform evaporated therefrom to yield 35.5 grams of n-propylisothiocyanate (70% yield).

In the practices of this invention as set forth in the foregoing examples, emphasis has been placed upon the addition of primary alkylamines, such as $C_1$–$C_{30}$ primary alkylamines, for the preparation of the substituted isothiocyanates. In addition to alkylamines other primary aliphatic amines, such as the primary cycloaliphatic amines, particularly the primary cycloalkylamines, are usefully employed. Suitable cycloalkylamines include the $C_5$–$C_{20}$ cycloalkylamines, such as cyclopentylamine, cycloheptylamine, cyclooctylamine, cyclononylamine, cyclodecylamine, cycloundecylamine and cyclododecylamine.

In general, the primary hydrocarbyl amines, i.e. amines made up of only hydrogen, carbon and nitrogen atoms, are useful as well as the substituted alkyl primary amines as exemplified by the formula X—$(CH_2)_n$—$NH_2$ wherein X is an aryl group, a halogen, OH or OR wherein R is an alkyl group containing 1–20 C atoms and wherein $n$ is an integer in the range 1–20.

Desirably, as indicated in the foregoing disclosure, it is preferred to form the reaction admixture comprising the amine, carbon disulfide and aqueous alkali metal hydroxide at a temperature below 30°C. and to carry out the oxidation of the resulting reaction admixture with gaseous oxygen also at a temperature below about 30°C. If desired, however, higher temperatures might be employed. Also, as indicated in the accompanying disclosure, it is preferred to carry out the reaction at atmospheric or ambient pressure. If desired, however, higher pressures, such as up to about 10 atmospheres pressure or higher and lower than atmospheric pressures, such as a pressure as low as about 0.1 atmosphere, or lower, might also be usefully employed.

As will be apparent to those skilled in the art in the light of the foregoing disclosure, many modifications, alterations and substitutions are possible in the practice of this invention without departing from the spirit or scope thereof.

I claim:

1. A method for the preparation of a substituted isothiocyanate which comprises contacting a reaction admixture formed from and consisting essentially of a $C_1$–$C_{30}$ alkyl or cycloalkyl primary amine, carbon disulfide and an aqueous alkali metal hydroxide solution with gaseous oxygen in the presence of an oxidation catalyst and at a temperature in the range 5°–30°C. and recovering from the resulting admixture a substituted isothiocyanate.

2. A method in accordance with claim 1 wherein said catalyst is activated carbon.

3. A method in accordance with claim 1 wherein a normally liquid water-immiscible halogenated hydrocarbon solvent for the substituted isothiocyanate is added to said reaction admixture.

4. A method in accordance with claim 1 wherein said amine is ethylamine.

5. A method in accordance with claim 1 wherein said amine is n-propylamine.

6. A method in accordance with claim 1 wherein said amine is n-butylamine.

7. A method in accordance with claim 1 wherein said amine is octadecylamine.

\* \* \* \* \*